J. S. PETER.
ADJUSTABLE STOP FOR CUT-OFF MACHINES.
APPLICATION FILED SEPT. 4, 1917.
1,295,587. Patented Feb. 25, 1919.
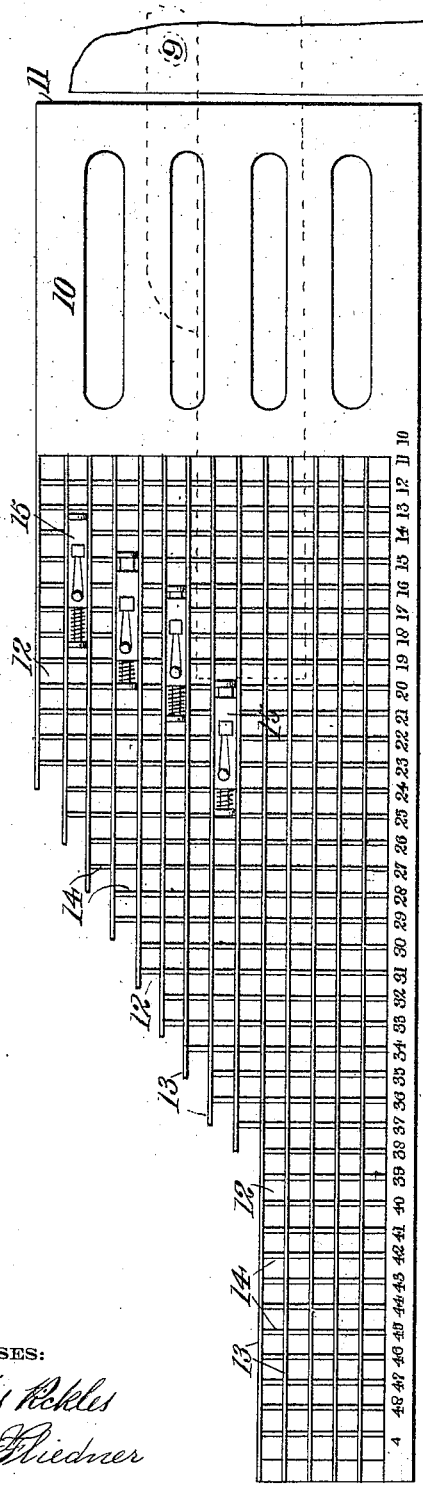
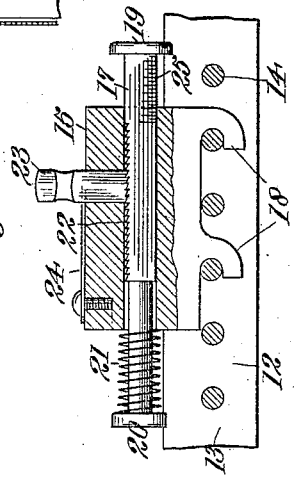
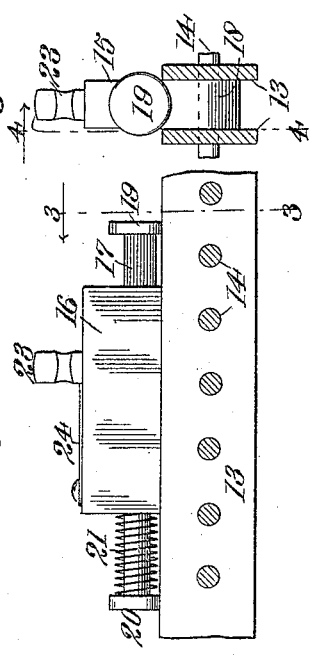
WITNESSES:
Charles Pickles
F. C. Fliedner
INVENTOR
James S. Peter,
BY Strong & Townsend
ATTORNEYS

UNITED STATES PATENT OFFICE.

JAMES S. PETER, OF WEED, CALIFORNIA, ASSIGNOR TO CALIFORNIA SAW WORKS, OF SAN FRANCISCO, CALIFORNIA, A CORPORATION OF CALIFORNIA.

ADJUSTABLE STOP FOR CUT-OFF MACHINES.

1,295,587.     Specification of Letters Patent.     Patented Feb. 25, 1919.

Application filed September 4, 1917. Serial No. 189,671.

*To all whom it may concern:*

Be it known that I, JAMES S. PETER, a citizen of the United States, residing at Weed, in the county of Siskiyou and State of California, have invented a new and useful Improvement in Adjustable Stops for Cut-Off Machines, of which the following is a specification.

This invention relates to adjustable stops for use in connection with cut-off machines operating on box boards, and the like, where boards are to be cut off in suitable lengths varying in accordance with the different sizes of boxes being made.

While but one board is cut at a time, it is impractical to employ a single stop since the condition of the lumber, owing to knots and other defects, may prevent cutting this one length without waste. Therefore, I arrange a plurality of adjustable stops in different positions of adjustment on a single plate or table to enable varying lengths to be cut without delay. The adjustments of the stops in inches is obtained by the provision of a series of rows of recesses on a table or plate, one row for each stop. The recesses of each row are spaced one inch apart on a line at right angles to the plane of the saw, and fractional inch adjustments are obtained by means of a stop member slidable in its casing and employing ratchet teeth on the slidable member and a detent on the casing to coöperate with the teeth, the teeth being about $\frac{1}{8}$ or $\frac{1}{16}$ inch apart and sufficient in number to provide any degree of adjustment less than one inch.

One form which my invention may assume is exemplified in the following description and illustrated in the accompanying drawings, in which—

Figure 1 shows a plan view of a device embodying my invention, a portion of the cut-off machine being illustrated in connection therewith and the position of the board being shown in dotted lines.

Fig. 2 shows a vertical, longitudinal, sectional view of a portion of the holder or plate for the stops, one of the stops being shown in position thereon.

Fig. 3 shows a sectional view, taken on the line 3—3 of Fig. 2.

Fig. 4 shows a sectional view, taken on the line 4—4 of Fig. 3.

The cut-off machine with which the stop devices are used is well-known in the art and, therefore, is not illustrated in detail. As will be understood, it comprises usually a circular saw 8 and a traveling table 9 to receive a board and feed the same to the saw. In front of the saw and at the side thereof remote from the traveling table I arrange a stationary plate 10, the end 11 of which is alined with the saw. This plate is provided with a plurality of rows of perforations or recesses 12, the number of rows in the present instance being shown as fourteen. The number of recesses in each row may vary, ranging from a comparatively few at the front side to the maximum number at the rear side, the openings being one inch apart. The device is intended to cut lengths of boards ranging from ten inches to four feet.

These apertures 12 are preferably made by arranging a series of longitudinally extending bars 13 in a cut-away portion of the plate to form the rows and a series of cross rods 14 passing through the bars to divide the rows into openings required distances apart. Since it is not required that each row have the same number of recesses, the bars 13 may be of different lengths varying from short ones at the front side to long ones on the rear side.

To coöperate with the apertures 12 I provide a plurality of stop blocks 15, approximately one for each row of apertures, each block comprising a casing 16 and a slidable stop member 17. The casing has projections 18 on its bottom to enter the recesses and curved or inclined in a direction away from the saw to engage two of the rods. The slidable member 17 projects at opposite ends of the casing and at the inner end has a head 19 against which the board abuts when in place on the traveling table and at the outer end a lug or projection 20, between which and the end of the casing an expansible coil spring 21 is fitted to press the slidable member in a direction away from the saw.

The slidable member, at its upper longitudinal edge, is provided with a series of ratchet teeth 22 from $\frac{1}{8}$ to $\frac{1}{16}$ of an inch apart and sufficient in number to provide an adjustment for any desired fractional part of an inch. A detent 23, slidably fitted in the casing, coöperates with the teeth and is pressed into engagement therewith by means of a leaf spring 24. A scale 25, on one side of the slidable member, indicates the position of adjustment of the same within its casing.

In operation, it is first determined at what length the boards should be cut. In ordinary box making there will be several different lengths ranging from ten to forty-eight inches for different sized boxes. However at any one time from six to a dozen lengths will, perhaps, be all that is needed. A corresponding number of stops are, therefore, set up in the proper position, those farthest from the saw being arranged in the rear rows of openings and the shorter lengths being at the front. The longer lengths are cut whenever the condition of the board will permit, but in actual practice the occurrence of knots and other defects in the board will frequently interfere with the cutting of the longer lengths. Therefore in order to prevent waste it becomes important that shorter lengths be cut, hence the advantage of the additional stops.

Assuming one of the desired lengths is 19¾ inches, a stop block is then placed in the twenty inch hole of its row and the slidable member is pushed toward the saw until the scale thereon registers ¼ of an inch. This adjustment is quickly accomplished, it being necessary merely to press inwardly on the slidable member since the teeth are inclined in a direction to raise the detent. To retract the slidable member the detent is lifted by hand, whereupon the spring 21 does the rest.

Various changes in the construction and arrangement of the several parts herein shown and described may be made without departing from the spirit of my invention as disclosed in the appended claims.

Having thus described my invention, what I claim and desire to secure by Letters Patent is—

1. In a stop device, a series of spaced parallel bars set on edge, a series of spaced cross rods passing through the bars to form a series of openings, stop blocks having means to engage the rods, and adjustable board engaging means borne by the blocks, said bars being held in their said relation by said cross rods.

2. In a stop device, a series of engaging means, a stop block, means carried by the block to engage said engaging means, a slidable member in said blocks having its ends extending beyond the respective ends of the block and having an abutment on each of its said ends, one of the abutments being for engagement with a board, a series of graduations on said member between said abutment and the adjacent end of the block, a coil spring surrounding the other end of the member and engaged with the other abutment and the other end of the block, a series of ratchet teeth on the member, and a lateral spring pressed slidable detent extending through the block and extending at one end therebeyond and having its opposite end formed with teeth to engage the ratchet teeth.

3. In a stop device, a series of spaced parallel bars set on edge, a series of spaced cross rods passing through the bars to form a series of openings, stop blocks having means to engage the rods, said stop blocks having their lower portions formed to be received in the space between the bars and to engage each, and a slidable board engaging member extending through the block and having its ends extending beyond the respective ends of the blocks and provided with enlargements engaged between and with the opposite and adjacent bars.

In testimony whereof I have hereunto set my hand in the presence of two subscribing witnesses.

JAMES S. PETER.

Witnesses:
H. J. BARRINGTON,
W. W. BROWN.

Copies of this patent may be obtained for five cents each, by addressing the "Commissioner of Patents, Washington, D. C."